Patented Nov. 6, 1951

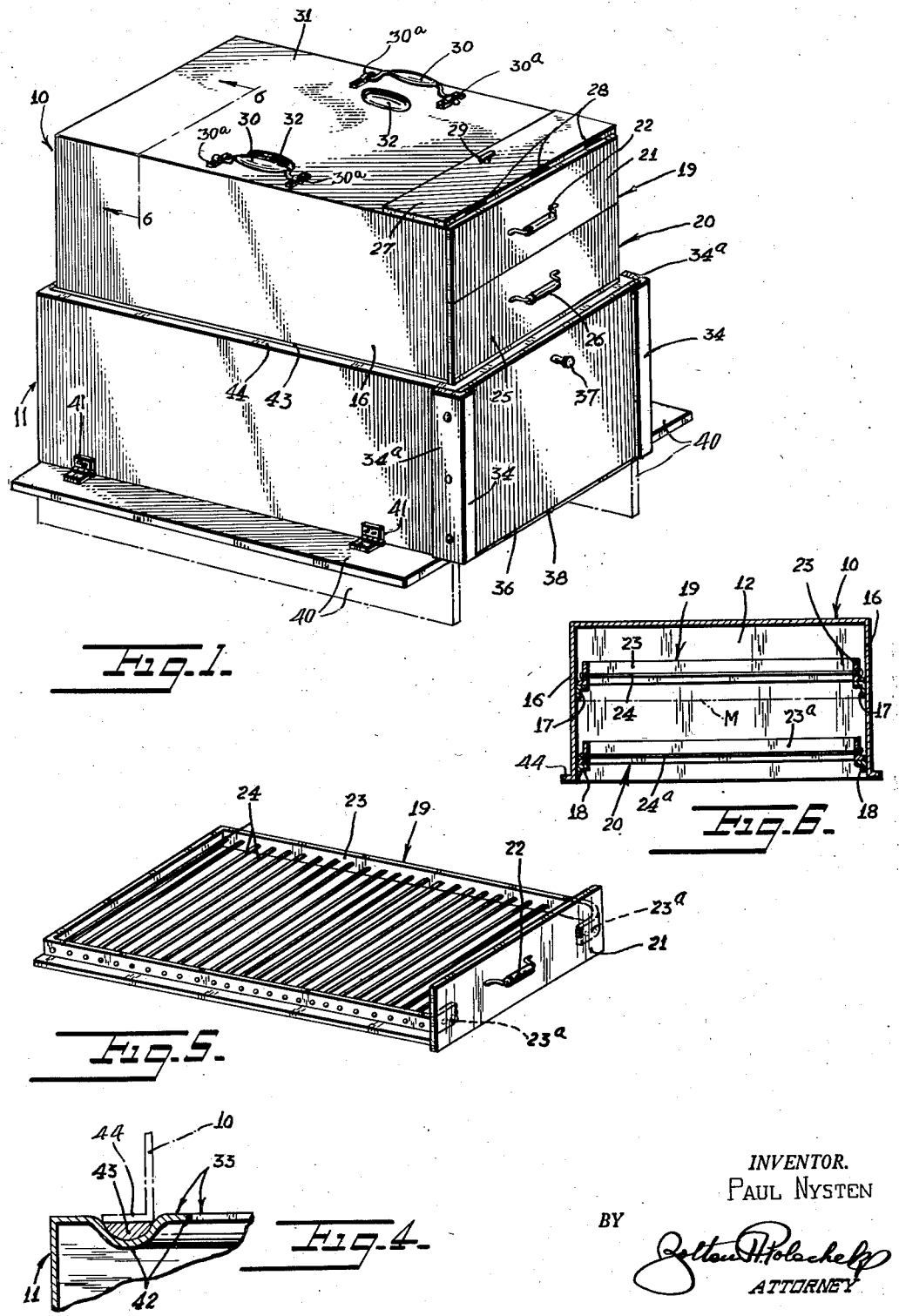

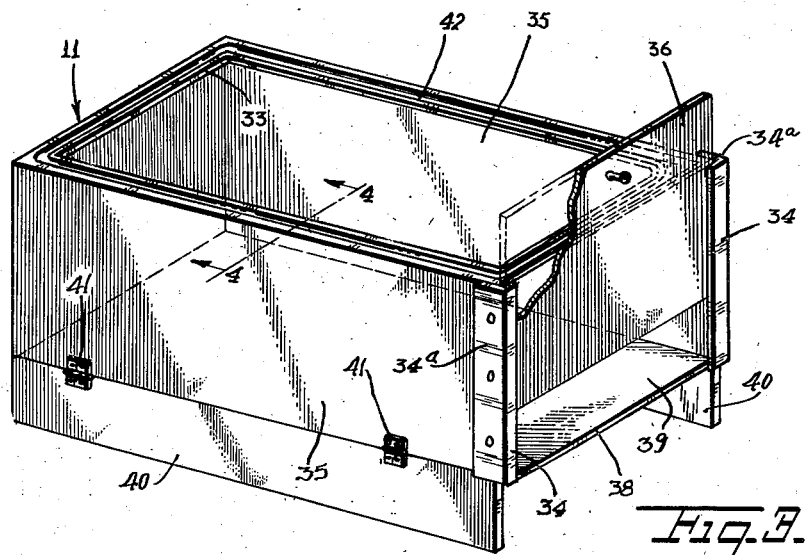
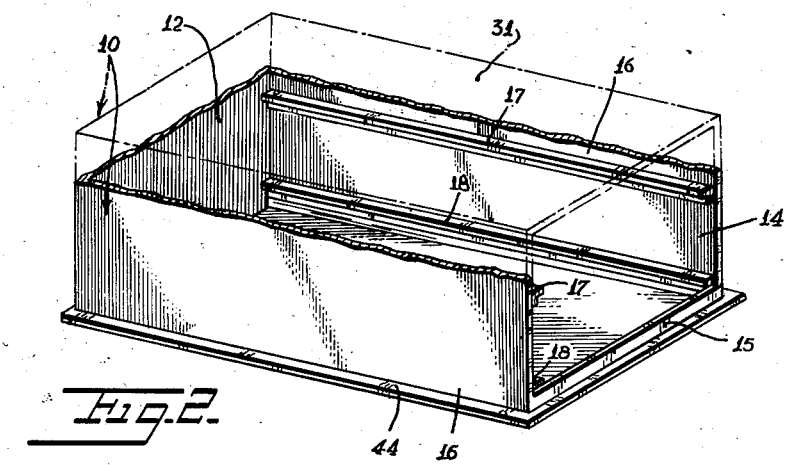
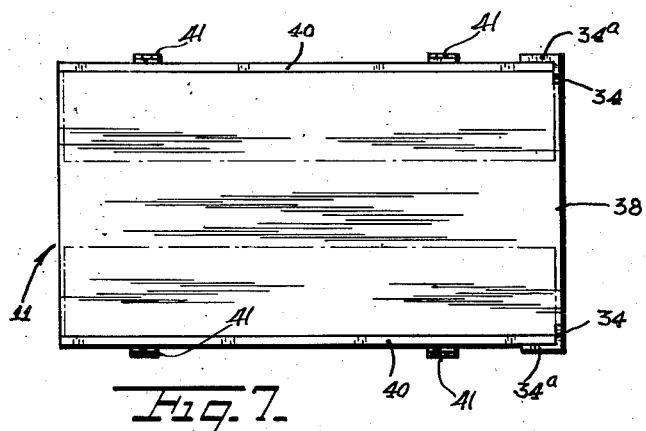
INVENTOR.
PAUL NYSTEN

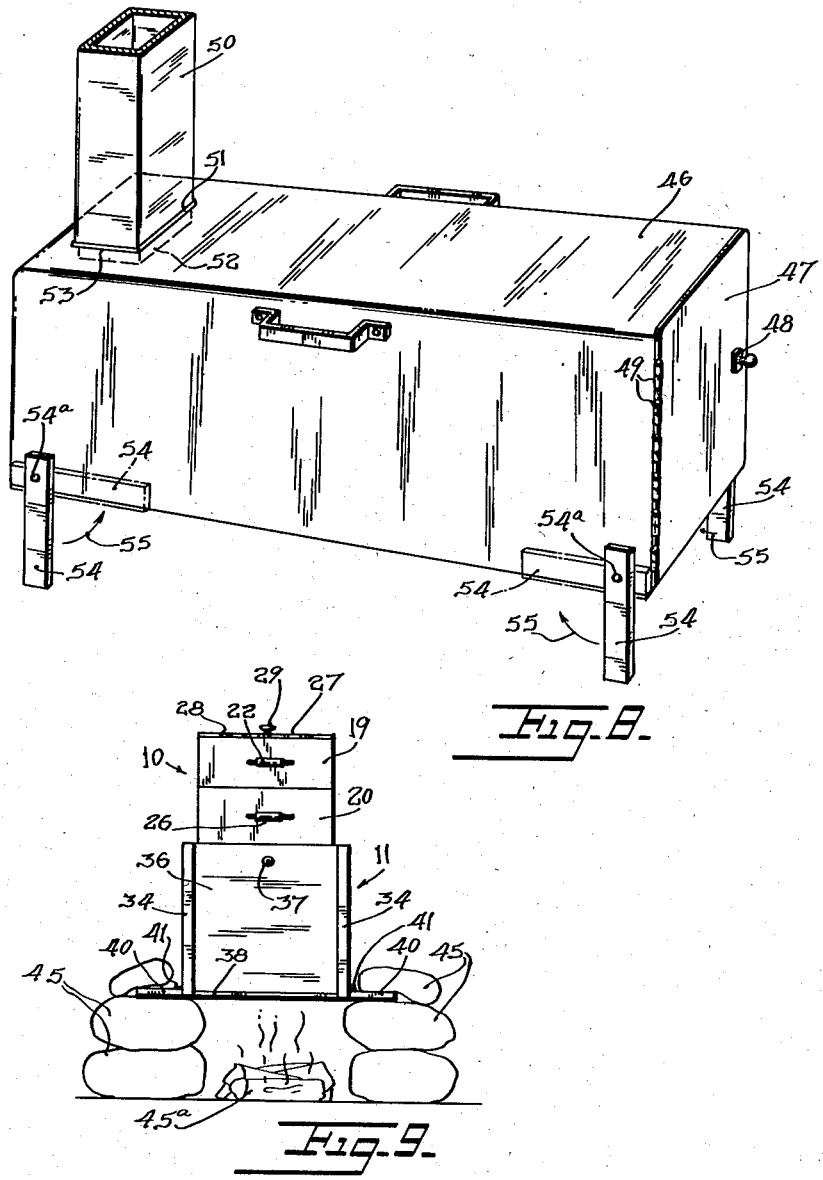

2,573,772

UNITED STATES PATENT OFFICE 2,573,772

SMOKE BOX FOR SMOKING MEAT, FISH, OR POULTRY

Paul Nysten, Flushing, N. Y.

Application October 21, 1948, Serial No. 55,714

2 Claims. (Cl. 99—259)

This invention relates to new and useful improvements in apparatus for employing hot smoke for the curing of such foods as fish, meat and the like, and, more particularly, the aim is to provide a novel and valuable portable apparatus for thus treating food and incorporating a first housing for providing a smoke generating chamber and a second housing for providing a food containing chamber, and, at the same time, an apparatus so made that the two housings are wholly separable, yet when the apparatus is set up for use, with the said first housing resting merely by gravity on top of said second housing, a smoke-tight joint is established between the two housings.

While the invention is valuable for the home, as on the land of a home owner, it is particularly valuable for use by the camper on a fishing and/or hunting trip, and in that connection especially so in regard to fish or game, to preserve the latter in perfect condition until return is made from even a long continued such trip. In herein referring to meat, then, that reference includes the meat of wild birds and animals, as well as that of domestic animals and ordinary poultry and fish.

As the invention is preferably carried out, the entire apparatus may be collapsed compactly, into a single comparatively light weight box-like unit, rectangular at all six sides, and with no parts projecting other than negligibly. At the same time, the housing which provides the chamber for the food to be smoked is provided with withdrawable grill-like supporting means of a kind adapted to handle fish or meat units of varying maximum thicknesses vertically. According to the invention, further, there may be two such supporting means, each a drawer having a grill-like bottom, and with one drawer having a lesser capacity in terms of the maximum vertical thickness of a fish or meat unit, and the other thereof having a greater such capacity. Again, in order to take care of a food unit of greater vertical thickness than the capacity of the last-named drawer, an arrangement is provided whereby this can be done, by removing one of the drawers; and yet without having to lose smoke through the opening closed by the removed drawer when it is in place.

The invention has other important features which will be pointed out or become apparent hereinafter.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view, showing a now favored embodiment of the invention.

Fig. 2 is in full lines a partially broken away perspective view of the upper housing of Fig. 1, with the drawer means removed; the upper shape of said housing being indicated in dot and dash lines.

Fig. 3 is a perspective view of the lower housing of Fig. 1, with a front slide-gate or shutter shown partly raised, and with the pair of bottom side wings lowered; said gate being shown broken away at an upper corner.

Fig. 4 is an enlarged detail view, being a section taken on the line 4—4 of Fig. 3.

Fig. 5 is a perspective view of the upper one of the two drawer means.

Fig. 6 is a transverse vertical section, taken on the line 6—6 of Fig. 1.

Fig. 7 is a bottom plan view of the lower housing, with said wings shown in full lines as in Fig. 1 and in dot and dash lines as in Fig. 3.

Fig. 8 shows in perspective a portable stove, for use if desired in connection with the parts shown in Fig. 1, and for use also, if desired, as a cook stove for any of the uses to which a cook stove is ordinarily put while in camp.

Fig. 9 is an end elevational view showing the device in use over a campfire.

Referring to the drawings more in detail, the upper housing in Fig. 1, this for providing the chamber in which the food to be smoked is to be placed, and below called the food cabinet, is generally marked 10; and the lower housing in Fig. 2, this for providing a smoke-generating chamber, and below called the smoker, is generally marked 11.

The food cabinet 10 is closed all over at its top, at its two sides, and at an end wall 12 opposite a front opening 14 bottomed by a low transverse panel 15. Suitably secured to the inner side of each side wall 16 of the cabinet are pairs of slide rails 17 and 18. The rails 17 are for supporting an insertable and withdrawable upper drawer 19, and the rails 18 are for similarly supporting a lower drawer 20.

The upper drawer 19 is shown as having a front plate 21, carrying a handle 22, and having rigidly extended therefrom a frame 23 including bent terminal portions 23ª suitably secured, as indicated in Fig. 5, to the rear side of the plate 21; said frame carrying a grill-type support 24 here shown as comprising a plurality of wires stretched across said frame. The lower drawer 20 is of like construction, as will be noted in Fig. 6, where its frame is marked 23ª and its grill-type support 24ᵉ; except that the front plate 25 of the drawer 20, carrying a handle 26, is of somewhat greater height than the plate 21. Thus (with the rails 17 and 18 arranged as in Fig. 6, in which view the meeting top and bottom edges of the plates 21 and 25 are indicated by the dot and dash line M with both drawers fully inserted), full insertion of both the drawers serves to close the cabinet's front opening 14 in substantially a smoke-tight manner.

To allow of use in the cabinet 10 of only the lower drawer 20, as where the food unit to be smoked is of greater vertical dimension than the space between the two drawers, but then with said opening closed, a drop-gate 27 is provided, this hinged to the cabinet as at 28; the plate constituting this gate carrying a handle 29, and being of an outline such as to have the gate act as a full substitute for the front plate 21 of the drawer 19 in closing in a smoke-tight manner the upper part of said front opening 14.

For easy handling of the cabinet 10, which for example could be about 20" long, 12" wide and 7" high, and which, like the smoker 11, desirably is made of sheet steel or aluminum, a pair of handles 30 is provided, each pivotally mounted in a pair of brackets 30ᵃ; while the roof wall 31 of the cabinet is illustrated as formed to present two depressions 32 into which the grips of the handles 30 are sinkable when the cabinet 10 is entered into the smoker 11, for full enclosure therein, in collapsing the apparatus as for transport.

To permit this, the inner dimensions of the smoker 11 are somewhat greater than the outer dimensions of the cabinet 10; it being noted that, while the smoker is closed at its bottom, at both sides, at its rear end, and framingly at its top as at 33, the front end of the smoker is open from top to bottom and for all of its width except for a pair of vertical side strips 34. These strips could be bent-over terminal portions of the side walls 35 of the cabinet, but as here shown are integral with separate pieces 34ᵃ of L-shaped cross-section suitably secured to said side walls 35. The horizontal spacing of the strips 34 is such as to permit the cabinet 10 to be passed therebetween.

Said strips 34 provide slideways forward of the front ends of the side walls 35, for a drop-gate or shutter 36, having a handle 37; which shutter, when fully lowered rests at its bottom on a ledge-like terminal portion 38 of the bottom wall 39 of the smoker, such portion shaped as best shown in Fig. 7.

For raising the bottom of the smoker 11 above the ground, to provide a fireplace, and in that connection desirably for erecting the apparatus with stability above an underlying pile of stones 45, as shown in Fig. 9, where the smoker is to be used over a camp fire 45ᵃ, the smoker 11 carries a pair of side wings here shown as in the form of elongate rectangular plates 40, these suitably hinged as at 41 to the bottom of the smoker. When the wings 40 are arranged, as shown by the full lines in Fig. 1, the wings 40 may be clamped between superimposed stones 45 to support the apparatus over a camp fire 45ᵃ.

Reverting to the structure 33 framingly arranged around the otherwise fully open top of the smoker 11, this structure is a narrow shelf formed to incorporate an endless groove 42 for having laid all along the length thereof an asbestos packing ribbon 43. The cabinet 10 is surrounded all around the bottom thereof by a narrow outwardly directed flange 44; the groove 42 being so located on the self 33 that the cabinet 10 may be lowered to have its footing means provided by the flange 44 rest squarely on the ribbon 43, as indicated in Fig. 4, and so effect, merely by the weight of the cabinet, a smoke-tight connection between the latter and the smoker 11.

In regard to the utility of the apparatus, the idea of smoking food, especially fish, by utilizing the method for which the apparatus of the present invention was conceived, namely, hot smoking, at home or in camp, is not a new one, but since ancient times has been in common use in Finland and perhaps elsewhere. It has thus been used, by fishermen and hunters, as well as householders at home, to prepare fish and meat for keeping it fresh over long periods, for imparting to it a better taste by making it juicier and of a more zestful and appetizing flavor, and for retaining at the maximum its nutritive properties. The structures employed, however, have been difficult to build, inefficient in operation, always having to be laboriously erected in situ, and wasteful of fuel and the smoke producing material burned.

On the other hand, by the use of the present apparatus, a fisherman or hunter, while away from home, will now have, for the first time, a relatively light-weight and practicably small-bulk portable apparatus, easily and instantly erectable, whereby fine fish and game meat may be quickly and properly cured to keep the same as fresh, juicy and delicious as though immediately prepared and eaten just after the catch or kill. Moreover, the common losses from spoilage during transport of the catch or kill, especially in hot weather, will be avoided; and tales of the size of, for instance, the mammoth fish caught will not be met by skepticism and gibes.

The recommended procedure, in using the apparatus, will now be explained.

To set up the apparatus of Fig. 1, remove the cabinet 10 from the smoker 11 and place the former on the latter as explained in connection with Fig. 4. Then, with the shutter 36 raised or temporarily wholly removed, fill the bottom of the smoker with fresh chips of alder, maple, or other deciduous trees. The thickness of the layer of chips will depend on the time required for the smoking process, and such thickness will range between one-half and three inches, the minimum for small fish and thin meat, and the maximum for large fish, poultry and fairly large meat units. Upon such chips layer place fresh branches of juniper or other coniferous trees, in a layer about two or three inches thick. Add a top layer of straw, about one or two inches thick. Press the layers down to good compactness. Restore the shutter 36 to full closure.

After rubbing salt to taste on the food to be treated, place such food on the grill-type floors of the drawers 19 and 20; being careful to lay no food unit on another. Then with the drawers fully closed, or the drawer 20 alone used as already explained, but in that case with the shutter 27 lowered, the smoke-curing of the food in the cabinet 10 will begin to proceed as soon as the materials in the smoker 11 become so heated as to begin the smoke generation. Such heat may proceed from the fireplace already mentioned, and as also mentioned with the bottoms of the lowered wings 40 resting on a pile of stones, or, with the wings 40 depended from the bottom of the smoker 11, as shown by the dot and dash lines in Fig. 1 or in full lines in Fig. 3, and resting on a stove.

The time required for treating different kinds of food varies from 14 minutes to two hours, viz:

For small fish, 15–30 minutes.
For large fish, 45–60 minutes.
For thin meat and small poultry, 1–1½ hours.
For thick meat and large poultry or like size game birds, 1½–2 hours.

To test whether food has been sufficiently smoked, a drawer is pulled out and the food tasted. Such drawer should, as soon as possible after the test, be pushed in all the way quickly, as it is very undesirable to allow too much fresh air to enter the cabinet 10.

When the food has been fully processed, remove the cabinet 10 from the smoker 11, rake out from the smoker the smoking materials therein, and, when the apparatus is to be collapsed for further transport, raise the shutter 36, slide into the smoker 11 the cabinet 10 and lower said shutter.

Referring to Fig. 8, this shows an auxiliary device, also componentally within the concept of the invention, which constitutes a somewhat collapsible and easily portable camp stove; on the top of which may be placed the apparatus of Fig. 1, with the wings 40 depended, as shown in Fig. 3. Such stove comprises a casing 46, made of suitably thin sheet metal, to provide a fire-box oven chamber accessible by way of an end door 47, having a handle 48 together with a suitable latch, and hingedly mounted as at 49. A readily detachable chimney 50 is shown as also included, the same having near its lower end a peripheral bead 51 above a bottom skirt 52 adapted to be downwardly inserted into an opening 53 in the top of the casing 46 at the end thereof remote from the door 47. The casing 46 carries four legs 54, each pivoted as indicated at 54ª, for vertical extension as shown. The stove may be collapsed to the bulk only of the casing 46, by removing the chimney 50 and storing it in the casing 46, and by swinging up the legs 54 as indicated by the small arrows 55.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A portable apparatus for hot-smoking raw food, comprising a smoker constituted by a housing having an open top framingly surrounded by an inturned ledge-providing shelf carried by said housing, a food-containing cabinet constituted by a second housing having an open bottom, withdrawable grill-like food supporting means in the cabinet, and means partially carried by said shelf and partially carried by said cabinet at its open bottom, said means including an endless element so placed and retained on said shelf that with the cabinet resting merely by its own weight on the smoker the cabinet bottom entirely perimetrally thereof may engage said element in substantially a smoke-tight manner, said two housings being wholly separable one from another and the interior dimensions of the smoker being such that the cabinet is wholly receivable in the smoker, said cabinet at its front end having an opening, and said grill-like supporting means including a pair of drawers having front plates which coact fully to close said opening when both drawers are fully inserted in the cabinet, each of said drawers having a grill-type bottom, said drawers being one above the other and there being slideway means for the drawers carried interiorly of the cabinet and so spaced that with both drawers fully inserted the bottom of the lower drawer is near the bottom of the cabinet and the bottom of the upper drawer is higher than the level midway between the top of the cabinet and the bottom of the other drawer, said cabinet having a gate movably mounted thereon for redisposition to close the upper part of said opening when only said lower drawer is in the cabinet, there being collapsible means for raising the bottom of the smoker, said means including wings pivotally connected to the smoker near its bottom.

2. A portable apparatus for hot-smoking raw food, comprising a smoker constituted by a housing having an open top framingly surrounded by an inturned ledge-providing shelf carried by said housing, a food-containing cabinet constituted by a second housing having an open bottom, withdrawable grill-like food supporting means in the cabinet, and means partially carried by said shelf and partially carried by said cabinet at its open bottom, said means including an endless element so placed and retained on said shelf that with the cabinet resting merely by its own weight on the smoker the cabinet bottom entirely perimetrally thereof may engage said element in substantially a smoke-tight manner, said two housings being wholly separable one from another and the interior dimensions of the smoker being such that the cabinet is wholly receivable in the smoker, said cabinet at its front end having an opening, and said grill-like supporting means including a pair of drawers having front plates which coact fully to close said opening when both drawers are fully inserted in the cabinet, each of said drawers having a grill-type bottom, said drawers being one above the other and there being slideway means for the drawers carried interiorly of the cabinet and so spaced that with both drawers fully inserted the bottom of the lower drawer is near the bottom of the cabinet and the bottom of the upper drawer is higher than the level midway between the top of the cabinet and the bottom of the other drawer, said cabinet having a gate movably mounted thereon for redisposition to close the upper part of said opening when only said lower drawer is in the cabinet, there being collapsible means for raising the bottom of the smoker, said means including wings pivotally connected to the smoker near its bottom, said wings being also extendable from the sides of said smoker for supporting the same over a camp fire on stones piled on opposite sides of the fire.

PAUL NYSTEN.

REFERENCES CITED

The following references are of record in the file of this patent:

UNITED STATES PATENTS

| Number | Name | Date |
|---|---|---|
| 133,377 | McDonald | Nov. 26, 1872 |
| 260,489 | Macholdt | July 4, 1882 |
| 405,630 | Vardon | June 18, 1889 |
| 1,302,952 | Neff | May 6, 1919 |
| 1,837,924 | Rutherford | Dec. 22, 1931 |
| 2,190,498 | Williams | Feb. 13, 1940 |
| 2,372,227 | Sanford | Mar. 27, 1945 |